M. A. SHEPARD.
Domestic Boiler.
No. 77,327.  Patented April 28, 1868.
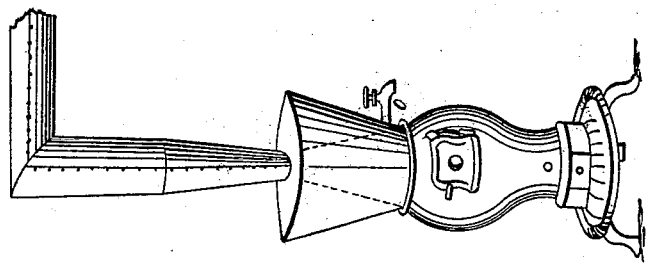
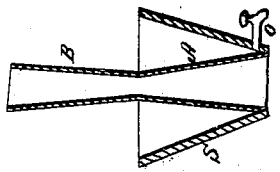
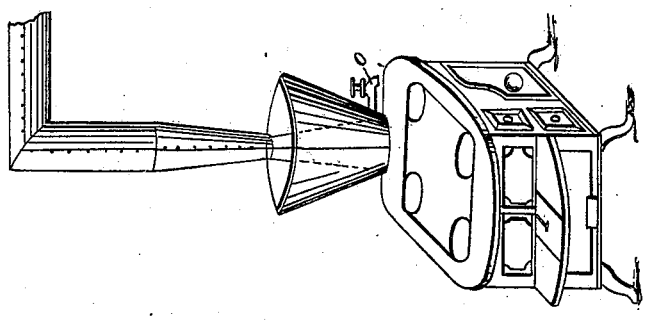
Witnesses:
B. J. Watson
Clinton Abernathy
Inventor:
M. A. Shepard

UNITED STATES PATENT OFFICE.

MORRILL A. SHEPARD, OF BRIDGEPORT, ILLINOIS.

IMPROVEMENT IN BOILERS UPON STOVE-PIPES.

Specification forming part of Letters Patent No. 77,327, dated April 28, 1868.

*To all whom it may concern:*

Be it known that I, MORRILL A. SHEPARD, of Bridgeport, in the county of Lawrence and State of Illinois, have invented certain new and useful improvements to be used in connection with stoves and furnaces, in order to economize the products of combustion and to heat water and other fluids expeditiously by virtue of this new arrangement; and that the following is a full, clear, and exact description of the same, reference being had to the accompanying drawings, forming a part of this specification, in which—

Figure 1 is a vertical longitudinal section of my improvement. Fig. 2 is a perspective view of it when used in connection with a stove, it making and forming a part of the pipe. Fig. 3 is the same view when it constitutes a part of the stove or furnace.

In the drawing, Fig. 1, A B are two cone-shaped pipes, B being inverted and fastened or joined onto A at its small end. If cast, they may be both cast in one piece or in two, and be joined on. S is a vessel fastened (if made out of sheet metal) at the bottom of the pipe A, and then flared out and up, in a proper and convenient manner, to form a vessel to hold water or other fluids. If made of cast metal, the pipe A and vessel S may be cast in one piece. O is a faucet, by which the fluid may be drawn off when desired.

The object of this improvement is partially to arrest the particles of combustion (that would pass off unconsumed in the ordinary arrangement of stoves and furnaces) by the first joint of the cone-shaped pipe—first, by its peculiar shape, as sparks have a tendency naturally to go straight up; second, by their coming in contact with a cooler surface than the stove, in consequence of this cone-shaped pipe being surrounded by a vessel containing water, the result is that the particles will adhere to such a surface to a certain extent, until they accumulate to such an amount that they will fall back into the fire and be burned over; third, the inverted cone-shaped pipe B by its flare will produce a greater draft to carry off the surplus smoke and steam; fourth, the vessel that is attached to this cone-shaped pipe is for the purpose of holding water or other fluids, which can, by virtue of this new arrangement, be heated quickly by the heat passing directly through the body of the fluid. It is not necessary that this vessel be of a funnel shape, as shown, but may be made in any form that the manufacturer may wish, either oval, rounding, or flaring, with cover, as desired.

One object I have in view especially is that this improvement may be used as the first joint of all heating-stoves, in order to have a vessel connected with it to hold water, that whenever the stove is heated up there will be a pleasant, healthy, and agreeable atmosphere in all rooms, churches, cars, hotels, &c., that are warmed by stoves and furnaces; and also for warming water quickly to heat up cars and churches by means of water-pipes connected with the vessel, as shown in Fig. 3.

I claim—

1. The cone-shaped pipe A, connected with the vessel S, as shown and described.

2. The inverted cone-shaped pipe B, attached to the pipe A, for the purpose set forth, as specified and described.

MORRILL A. SHEPARD.

Witnesses:
JOHN W. HILL,
CLINTON ABERNATHY.